United States Patent [19]

Sampson et al.

[11] 4,337,751
[45] Jul. 6, 1982

[54] BARBECUE GRILL ACCESSORY

[76] Inventors: Gerald L. Sampson, 5324 Long Acre Rd.; John E. Rummele, 2219 N. 7th, both of Sheboygan, Wis. 53081

[21] Appl. No.: 117,669

[22] Filed: Feb. 1, 1980

[51] Int. Cl.³ .......................... B28D 1/32; A47B 5/00
[52] U.S. Cl. .................................. 126/25 R; 126/9 B; 108/47
[58] Field of Search .................. 126/25 R, 41 R, 9 B, 126/30, 41 E; 108/46, 47, 44, 108; 99/484

[56] References Cited

U.S. PATENT DOCUMENTS

| | | | |
|---|---|---|---|
| 2,101,686 | 12/1937 | Offutt | 108/46 |
| 2,142,263 | 1/1939 | Bentz | 108/47 |
| 2,768,042 | 10/1956 | Persinger et al. | 126/9 B |
| 2,886,386 | 5/1959 | Spitzer | 126/25 R |
| 2,985,164 | 5/1961 | Imoto | 126/25 R |
| 3,244,163 | 4/1966 | McGlaughlin | 126/25 R |
| 3,391,682 | 7/1968 | King et al. | 126/25 R |

FOREIGN PATENT DOCUMENTS 648216 10/1961 Canada ................................. 108/46

*Primary Examiner*—Samuel Scott
*Assistant Examiner*—Randall L. Green

[57] ABSTRACT

For a grill of the type having a fire bowl for containing hot coals, a readily attachable and detachable support and a wooden tray-table which is removably seated on the support. The support is of stiff wire with a pair of clips to slip over the lip of the fire bowl, and the table rests on an open frame of the support. The lower surface of the table includes rubber bumpers within the outline of the frame to prevent shifting of the table yet permit lifting the table from the frame for use as a serving tray. The wire frame is of open U-shape and resilient to permit spreading its legs so that the clips can be connected to fire bowls of different diameter. A readily connectible and removable strut with forked ends connects between the frame and the understructure of the grill to further support the frame. The clips are formed from thin metal so they do not prevent complete closing of the cover of kettle-type grills.

1 Claim, 7 Drawing Figures

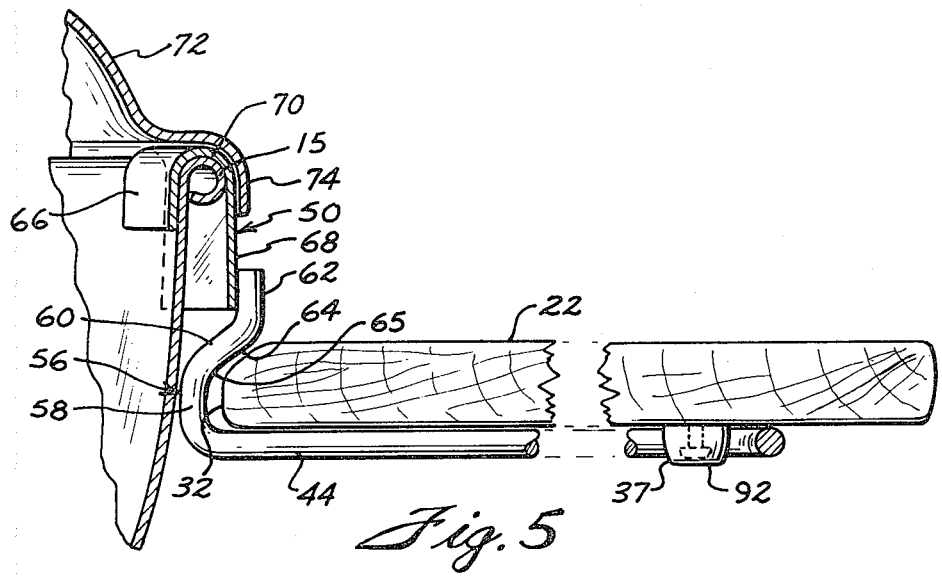
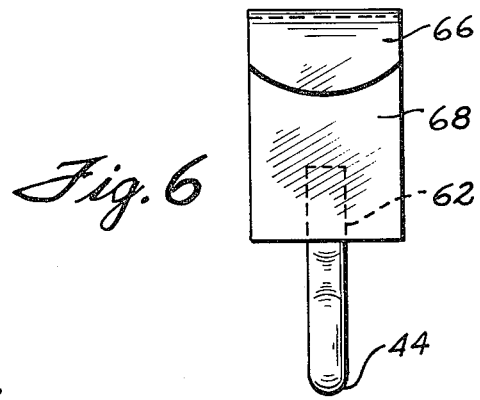
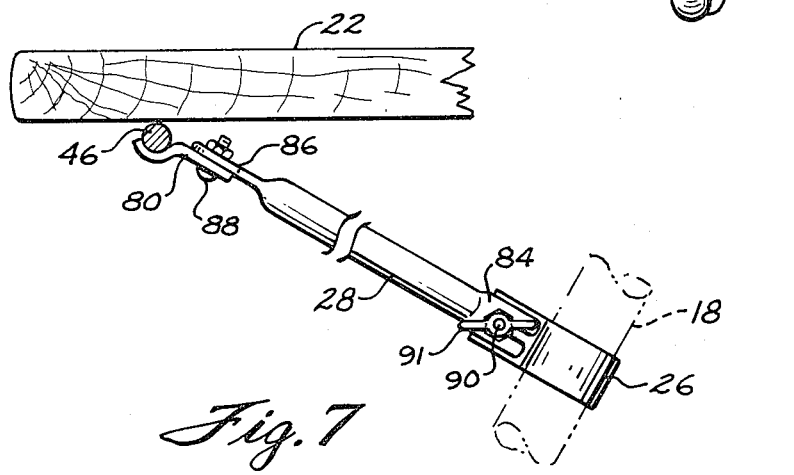

BARBECUE GRILL ACCESSORY

BACKGROUND OF INVENTION

This invention relates to a barbecue grill accessory and more particularly to a table for a barbecue grill that may be removed from the grill for use as a serving tray for food, and a support frame for the table which is easily connectable to and removable from the grill.

It is customary during the hot weather months of the year to cook meat outdoors on grills containing charcoal or artificial coal heated with gas. Such grills have a fire bowl or kettle for containing the hot coals and a metal grid spaced above the coals for supporting the meat to be cooked. These grills, however, generally have not in the past included any surface for supporting such items as plates, utensils, and condiments used during cooking of the meat, and therefore a separate table or stand is often used to support such items.

While an outdoor grill having a work surface of table is disclosed in U.S. Pat. No. 2,886,386, and the work surface provides a support for plates, utensils, and condiments, used during the cooking process, the work surface is permanently attached and suffers from the disadvantage that it is difficult to properly clean after use, becomes weather beaten if the grill is left outdoors for prolonged periods of time, and makes the barbecue grill cumbersome to store because of the added dimension of the work surface.

These disadvantages of the prior art, and especially the aforementioned U.S. patent, are overcome with the present invention, and commercially acceptable embodiments of an accessory for an outdoor grill and the like are herein provided which are not only fully capable of providing table-work support functions to satisfy most required conditions but which is also capable of other functions completely beyond the capabilities of the devices of the prior art. More particularly, however, the tray-table and frame accessory of the present invention is easy to remove and attach, is convenient to use, is inexpensive to manufacture, can readily be shipped in a small package, and the tray-table can be used as a serving tray with or without the grill.

SUMMARY OF INVENTION

This invention relates to an outdoor grill accessory and more particularly, an outdoor grill attachment having a removable work surface in the form of a tray-table. The fire bowl or kettle of a grill is supported by an understructure usually with legs and sometimes with wheels to facilitate moving the grill about. The accessory includes a fabricated U-shaped, wire support frame of substantial width and depth but of low vertical height, (for easy packing). The wire support frame includes a pair of clips which fit over the lip of the kettle and permit hanging the wire support on the grill generally in cantilever fashion. The clips are of thin metal so as not to interfere with normal closing of the cover of a kettle-type grill. The wire support is somewhat resilient to permit spreading its legs so the support can be used with fire bowls or grills of several different diameters, by spreading the legs so the clips can fit over the lip of the kettle. An aluminum brace with forked ends is releasably attached at one end to the understructure of the grill, and at the other end to an outer leg of the wire support, to rigidly, yet removably mount the support on the grill. A wooden work surface rests on the wire support and can be lifted from the support for use as a cutting board or a serving tray.

In the preferred embodiment of the present invention, the wooden tray has a concave edge to permit the tray to fit close to the exterior surface of the curved wall of the kettle. The top surface of the tray or work board can have a gravy groove to collect meat juices, and the lower surface includes a number of projecting rubber feet in an array just within the outline of the wire support so that the feet prevent outward and sideward displacement of the tray while the concave edge limits movement toward the kettle. The feet thus prevent the tray from sliding off the wire support, without hampering removal of the tray by simple lifting, and also provide for supporting the board when it is to be used as a serving tray, cutting board, etc.

In the broadest concept, any type of tray may be used for the combination work table and serving tray of the present invention, however, it is preferred to use a wooden tray made from a flat grained northern hardwood sealed with white mineral oil and pure paraffin which conditions the wood for use as a cutting board.

Accordingly, it is a feature and object of the present invention to provide as an accessory for a grill or charcoal broiler a work surface in the form of a table or tray for plates, utensils, and condiments.

It is another feature and object of the present invention to provide a work surface for an outdoor grill which is easily attachable and removable from the grill and which surface can function as a serving tray, cutting board, cheese or snack tray.

It is another feature and object of the present invention to provide a subassembly for attachment to outdoor grills and having an easily removable work surface supported by an easily attachable and removable wire frame braced to one leg of the grill.

It is a further feature of the invention to provide, as an accessory for a grill, a compact, easily packaged worktable and support which is easily connected to the grill and in which the work table takes the form of a tray removably supported on the support so that the tray can be removed simply by lifting.

These and other features and advantages of the present invention will become apparent from the following detailed description, wherein reference is made to the figures in the accompanying drawings.

BRIEF DESCRIPTION OF THE DRAWINGS

FIG. 5 is a partial view in broken section taken along line 5—5 of FIG. 1;

FIG. 6 is a front view in elevation of a clip for hooking the support frame on the fire bowl; and FIG. 7 is a broken in section taken along line 7—7 of FIG. 1.

DETAILED DESCRIPTION

Figure 1:
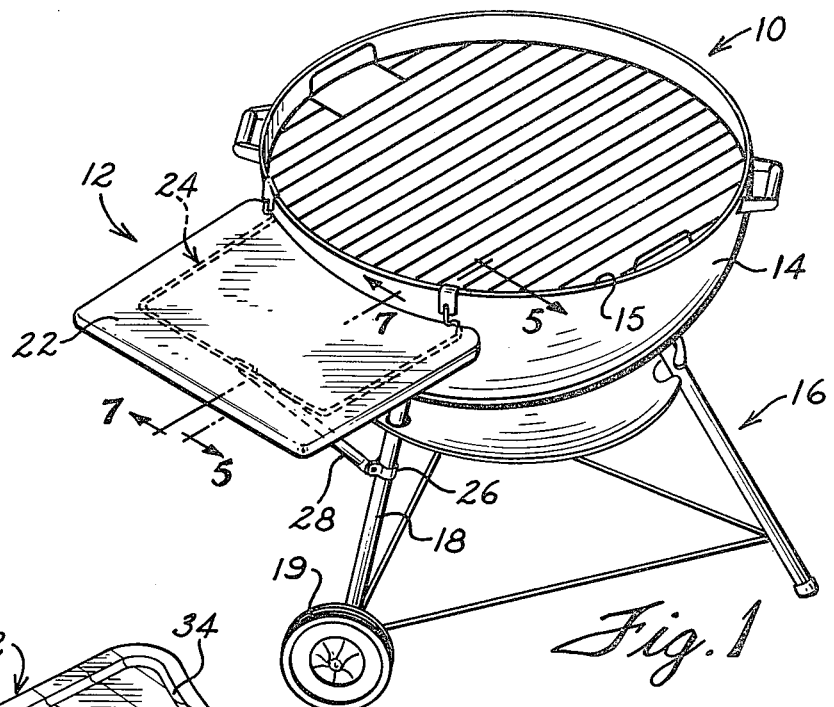
FIG. 1 is a pictorial view of a conventional barbecue grill having mounted thereon a table and table support according to the invention.

FIG. 1 is a pictorial view of a conventional barbecue grill 10 having mounted thereon the accessory table of this invention indicated generally at 12. Barbecue grill 10 includes a circular kettle or fire bowl 14 having an outwardly rolled rim or lip 15, and an understructure 16, supporting the fire bowl on the ground and which customarily includes a supporting leg 18, which in the construction of the grill shown slopes inwardly toward the bowl from a wheel 19.

The accessory table includes only four major parts. FIGS. 1-4 show these parts to be a table or tray 22, a table support frame 24, a clamp 26 positioned on leg 18 of the grill, and a tubular brace 28 connected between clamp 26 and support frame 24.

Figure 2:
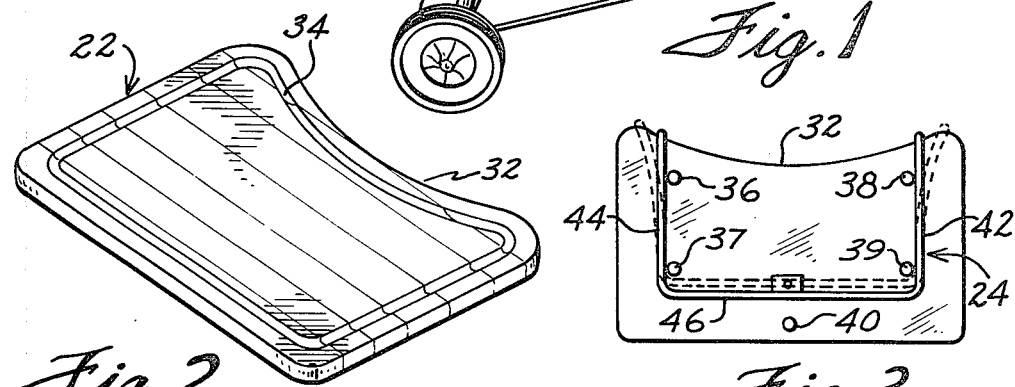
FIG. 2 is a pictorial view showing the table of FIG. 1 in the form of a cutting board.

Table 22 is advantageously a hard wood table or tray which is generally rectangular with rounded corners but has a concave edge 32 of a radius of curvature slightly greater than the radius of curvature of fire bowl 14. Table 22 can advantageously take the form of a cutting board as shown at FIG. 2, which is sealed with mineral oil and paraffin, and can have a continuous gravy groove 34 formed in its top surface and spaced slightly inwardly of its periphery. Table 22, as shown in FIG. 2, is formed from several strips of hard wood glued together to provide a "butcher block" effect.

Figure 3:
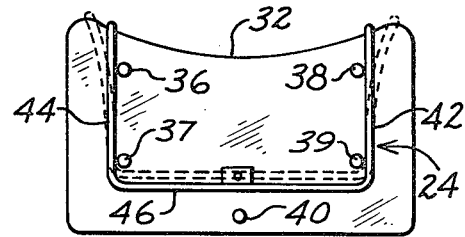
FIG. 3 is a bottom plan view of the table and wire frame support showing the positional relationship of the feet of the table relative to the wire frame.

As shown at FIG. 3, the bottom of table 22 has supporting feet 36-40 in a pattern on the underside of the table. These feet support the table when it is removed from frame 24 and placed on a horizontal surface. The feet space the bottom of the table a sufficient distance above such a horizontal surface that the fingers of the user can readily grasp its sides to lift the table. Feet 36-40 perform an additional function which will soon be described.

Figure 4:
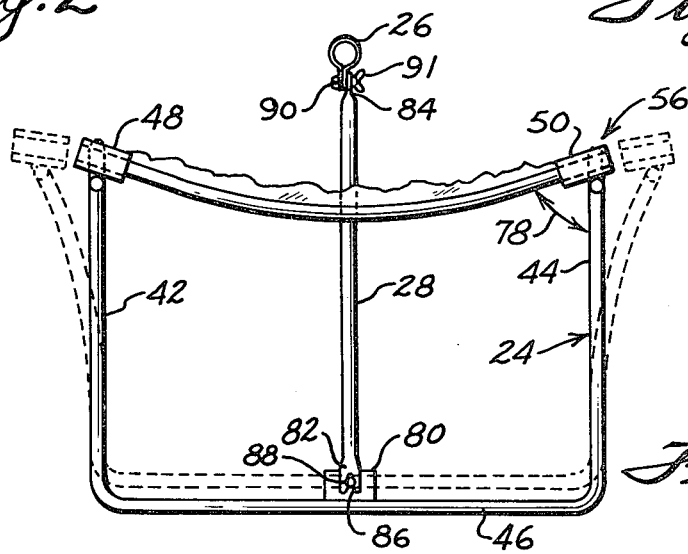
FIG. 4 is a top plan view of the components of the support frame with the table removed and portions of the grill cut away for clarity, FIG. 4 also showing in dotted lines the manner in which the frame can be spread to permit its use with fire bowl grills for different diameters.

FIG. 4 shows the table support components in their assembled positions on a grill. The support frame 24 takes the form of a frame, bent from heavy wire or thin metal rod of about ¼" diameter to form a frame which is generally U-shaped as viewed from above. The frame includes side legs 42 and 44 bent to extend perpendicularly from the opposite ends of an outer leg 46. Inverted U-shaped metal clips 48 and 50 are fixed respectively to inner ends 56 of legs 42 and 44.

The front or inner ends 56 of each leg such as leg 44 (FIG. 5) is reverse bent to form an end which is concave with respect to edge 32 of the board. This front end 56 includes a slightly greater than 90° bend to provide an upright portion 58 then a less than 90° bent to provide a sloping portion 60, and then another bend to provide an upright tip 62. Tip 62 is welded to clip 50 to secure the clip to the frame. The sloping portion of the so formed concavity 65 provides a downwardly facing surface 64 which extends a short distance over the table 12 adjacent inner edge 32 of table 12 (as shown at FIG. 5) to prevent direct vertical lifting of this inner edge. The several bends formed in front end 56 are each in a vertical plane passing through the axis of leg 44 so that the portions 58, 60, and 62 are in the same vertical plane as leg 44.

Each clip 48 and 50 is bent from a rectangular piece of thin sheet metal, and takes the form of a hook with a short flat tip 66 and a longer flat body 68, as shown for clip 50 at FIGS. 5 and 6. The bend 70 between the body and the tip is substantially semi-circular and conforms to and is a close fit on lip 15 of the fire bowl. The upright tip 62 of side leg 44, is welded to the outer face of body 68 of the clip near the lower end of the body, so the upper end of the tip is significantly below the lip 15.

Kettle-type grills such as the grill 10 conventionally have a cover 72 (FIG. 5) with an outwardly and then downwardly extending peripheral rim 74 which permits obtaining a more or less loose seal when the cover is positioned on the grill. By virtue of the thin sheet metal from which clips 48 and 50 are formed, and because body 68 of each clip extends generally vertically downwardly when positioned on the lip of the fire bowl, cover 72 can still be used with the grill, perhaps requiring a slight downward force to close the cover over the clips to the position shown at FIG. 5. Further absence of any interference with closing of the cover results from locating the support frame a sufficient distance below the edge of the rim of the cover so that the table cannot interfere with the closing of the cover.

As shown at FIG. 4, each of the clips is substantially wider than the wire material of frame 24. Also, each clip is mounted at an acute angle to the axis of the leg to which it is attached. This angle is indicated as the angle 78 at FIG. 4. The angle 78 is, of course, that angle at which the center line of the bend 70 is tangent to the center line of the rolled lip 15 of the fire bowl.

As shown at FIGS. 4 and 7, clamp 26 takes the form of a metal strap which extends around the leg and has projecting ends to receive a bolt to tighten the clamp on the leg 18 of the grill. At the longitudinal center of the outer leg 46 of support frame 24 is a sheet metal tab 70 which is welded to the leg. This tab extends inwardly toward the grill and downwardly at an angle of approximately 30° to the horizontal plane of the several legs of the frame. Brace 28 takes the form of a metal tube, the ends of which are flattened. End 82 is flattened in a plane perpendicular to the plane of the flattened end 84. Each end is provided with an elongated slot having one end open. The slot 86 in end 82 facilitates connection of and removal of the brace to the screw and nut assembly 88 fitted to tab 80. Clamp 26 is secured to leg 18 by a bolt and nut assembly 90. End 84 of the brace is slipped over the stem of the screw after the nut is tightened, and is clamped between the nut and a wing nut 91 threaded on the screw. This arrangement permits removing end 84 of the brace without loosening the clamp 26 so the clamp need not be repositioned when the brace is reconnected.

The feet 36-40 on the underside of table 12 and which were previously referred to with respect to FIG. 3, are all identical. FIG. 5 shows foot 37 in greater detail. Foot 37 has a vertical height greater than the diameter of the wire of frame 24 so the bottom surface 92 of the foot is slightly below the bottom of the legs of the frame when the table is mounted on the frame. As shown in FIG. 3, the feet 36-39 are in a generally rectangular pattern with the feet 36 and 37 closely adjacent side leg 44 and the feet 38, 39 closely adjacent side leg 42 when table 12 is mounted on the frame. Correspondingly, these feet function also to prevent lateral shifting or sliding of the table with respect to the frame. Further, the feet 37 and 39 limit the extent of outward shifting movement of the table on the frame by engagement with the outer leg 46.

Table 12, frame 24, brace 22, leg clamp 26, and the necessary fasteners are sold together as the accessory. By virtue of the construction of the frame, of low vertical height, these components can be easily packaged in a relatively small box to facilitate marketing.

To mount this accessory on grill 10, clips 48 and 50 are placed over the kettle lip 15 and are pushed down on the lip. These clips preferably form a firm friction fit on the lip. With the clips so installed, portions 58 at the inner ends of the frame legs abut the side of the bowl 14, as shown at FIG. 5, so that the frame is supported in generally cantilever fashion and extends horizontally from the bowl. Next, clamp 26 is placed around leg 18 of the grill, is moved vertically along the leg and is secured to the leg by tightening the clamp screw. End 84 of brace 28 is then installed between the nut on the screw and wing nut 91. Finally, end 86 of the brace is secured to tab 80 with screw and nut 88.

To mount table 12 on frame 24, it is merely necessary to tilt the inner edge 32 of the table downwardly so that it enters the concavity 65 at the front of the respective legs 42 and 44, and then lower the rear of the table, whereupon the feet 36–39 on the underside of the table are within the outline of frame 24 and prevent the table from sliding off the frame.

Kettle grills such as the grill 10 have bowls 14 which are made in slightly different diameters by different manufacturers. These bowls can be, for example, 22 inches to 26 inches in diameter. The frame 24 shown and described, has the clips 48 and 50 positioned at an angle 78 with respect to the frame legs, to fit on a bowl which is 22 inches in diameter. However, the accessory can also be used with larger diameter bowls because of the resiliency of the open U-shaped frame 24. To accommodate the frame to a larger bowl, for example, one having a diameter of 24 inches, legs 42 and 44 are elastically spread outwardly, as shown at FIG. 4 so that the clips 48 and 50 can accommodate and slip over a larger diameter bowl without twisting the clips relative to the legs 42 and 44. Such spreading of the legs 42 and 44 moves leg 46 closer to the fire bowl and causes the concavities 65 at the front of the legs to move outwardly along the concave edge 32 of the table which causes the table when seated on the frame to extend further across the outer leg 46 of the frame.

To enable the table to still be used when the frame legs are spread as shown at FIG. 4, feet 37 and 39 are originally so positioned on the underside of the table that they are spaced from the inner edge of outer leg 46 when the table is seated in concavities 65 and the frame is mounted on a 22 inch bowl. This spacing is preferably slightly less than the extent of the horizontal overhang of stop surface 64 over the edge 32 of the table. Correspondingly, when the frame is mounted on a 24 inch fire bowl, rather than a 22 inch fire bowl, leg 46 is further inwardly, and the table 12 is further outwardly relative to the bowl, but the feet 37 and 39 will still enter the frame to prevent shifting of the table.

It will be appreciated that the table is freely supported on the frame, but the frame is wholly covered by the table which is larger than the frame. The table can easily be removed simply by lifting its outer edge so that the feet 37 and 39 clear outer frame leg 46 whereupon, the table can be pulled away from the grill until the edge 32 is out of the concavity 65 and beyond the stop surface 64. Then, the table can be lifted vertically. By virtue of the stop surfaces 64 at the front of the frame and the feet 36–39 at the bottom of the table within the U-shaped frame, the table, while seated freely on the frame is effectively restrained from being knocked off the frame even if the table receives a substantial bump or jolt.

It will be further apparent from FIG. 5, that the portions 58 at the front end of each leg effectively space edge 32 of the table from the fire bowl so that there is no danger of direct contact with the outside surface of the fire bowl which could cause charring or darkening of the wood of the table. In addition, since the frame is formed from circular wire, the portions 58 can at best make line contact with the outside surface of the fire bowl and correspondingly, heat transfer between the fire bowl and the frame is minimized.

To remove this table accessory from the grill, the table 12 is first lifted off, brace 28 is then removed by loosening the wing nut 91 at clamp 26 and the screw 88 at tab 80, and the clips 48 and 50 are then lifted from the lip of the fire bowl. Leg clamp 26 remains fixed on leg 18 of the grill to permit reinstalling the accessory without again adjusting the clamp along the grill leg.

In view of the above description it is evident that the invention provides a table and support for a grill which is easily connectable and removable, and requires no drilling or other modification of the grill.

While the preferred embodiment has been shown and described for use with a grill having a circular fire bowl, the accessory of this invention can be used with fire bowls of other shapes such as rectangular, without evading the spirit of the invention.

While a preferred embodiment of a table accessory for a grill has been shown and described, numerous changes can of course be made without departing from the intended scope of this invention.

What is claimed is:

1. A barbecue grill accessory for a grill having a fire bowl with a rim and an understructure supporting the fire bowl, said accessory comprising (a) a generally U-shaped wire frame comprising a horizontal outer portion and side legs bent at an angle to the outer portion, said side legs extending generally horizontally toward the fire bowl and having inner end portions that extend vertically and which are adapted to abut against the exterior surface of said fire bowl below the rim, said side legs not contacting each other or anything else other than said outer portion so that the side legs can thereby be spread apart with respect to each other depending upon the diameter of the fire bowl, said inner end portions being configured to include a stop means portion on the frame which will extend over and partially around an inner edge of a table to prevent accidental upward displacement of the front of the table relative to the U-shaped wire frame, (b) inverted U-shaped metal clips connected to the vertical inner end portion of each side leg, each said clip being adapted to hook over the rim of the fire bowl and cooperating with said vertical inner portions of said side legs that abut against the exterior of said fire bowl so as to thereby support said wire frame in a cantilevered fashion with respect to the fire bowl so that the U-shaped wire frame extends in a generally horizontal plane at an elevation below said rim;

(c) said U-shaped frame constituting an upwardly facing support surface for loosely supporting said table thereon, (d) said table seated on said support surface in spaced relation to said rim to enable closing a cover of the grill over the rim without interference from the table, said table having a width greater than the width of said wire frame, (e) a brace removably connected to the understructure of the grill, said brace extending upwardly at an angle and having an upper end secured to said outer portion of the frame to further support the outer portion of the frame, and (f) an array of feet on the bottom of the table arranged within and closely adjacent the inner outline of the U-shaped wire frame so that the table will not move laterally and outwardly relative to the frame.

* * * * *